Patented May 6, 1930

1,757,400

UNITED STATES PATENT OFFICE

ALFRED THAUSS, OF COLOGNE-DEUTZ, GERMANY, ASSIGNOR TO GENERAL ANILINE WORKS, INC., OF NEW YORK, N. Y., A CORPORATION OF DELAWARE

SULPHURIZED COMPOUNDS OF PHENOLS

No Drawing. Application filed July 7, 1927, Serial No. 204,142, and in Germany July 15, 1926.

In U. S. Patent 1,450,463 sulphurized compounds of phenols are described which may be obtained by heating phenolic compounds such as phenols, cresols, chlorphenols and the like with aqueous caustic alkali and sulphur, preferably in quantities larger than the molecular proportions. These compounds are easily absorbed by undyed cotton fiber and act as mordants for basic colors.

In further development of the process for manufacturing these compounds, I have found that it is possible to replace the caustic alkali to be used according to the process described in U. S. Patent 1,450,463, by neutral salts of weak organic or inorganic acids. For instance acetic acids, formic acids, hydrosulphurous acid, nitrous acid, etc. can advantageously be employed. The requisite amounts are very small. When adding, for instance, one of the above mentioned salts in an amount of less than 1% of the phenol employed, a vigorous evolution of hydrogen sulphide and a rapidly progressing sulphurizing of the phenols is caused which is completed after several hours. The products thus obtained have the same properties and are identical with the products claimed and described in U. S. Patent 1,450,463.

According to my process free resinic acids of the thiophenols are obtained which, by boiling with dilute alkali and evaporation, can easily be converted into the water soluble alkali salts.

*Example 1.*—38 parts (1 mol) phenol, 22 parts (1.65 mol) sulphur and 0.8 parts (0.03 mol) sodium formate are slowly heated with stirring to 180 to 210° C. and maintained at this temperature for several hours until the first brisk evolution of hydrogen sulphide has ceased and the melt has become viscous and weakly green. The melt is poured out and solidifies to a brittle glassy mass, which can be ground to a light grey powder. It is dissolved in boiling caustic soda lye avoiding an excess of the same and the solution is evaporated to dryness advantageously in a vacuum. The sodium salt of the phenol resin thus obtained is easily soluble in water with a slight olive green coloration and possesses the same properties as the product obtained according to example 1 of U. S. Patent 1,450,463.

*Example 2.*—38 parts (1 mol) phenol, 20 parts (1.55 mol) sulphur and 0.3 parts (0.01 mol) sodium nitrite are allowed to react as described in Exampde 1, until the evolution of hydrogen sulphide (commensing at about 180° C. and rapidly increasing) is complete, the process occupying about 8 hours. The cooled and ground melt forms a light grey powder of the same properties as the sulphurized product obtained in Example 1. The solution of the sodium salt has practically no coloration even in comparatively high concentration and is free from any yellowish tinge.

*Example 3.*—When in the preceding example the sodium nitrite is replaced by the same quantity of sodium hydrosulphite, the process of sulphurizing proceeds in an analogous manner and leads to products of the same physical, chemical and tinctorial properties. Instead of sodium hydrosulphite likewise neutral sodium sulphite can be employed.

In the following claims the term "a weak acid" is intended to comprise weak organic carboxylic acids as for instance acetic acid, formic acid, as well as weak inorganic acids such as hydrosulphurous, sulphurous or nitrous acid; the term "neutral salts" is intended to comprise such salts of the weak acids as are stable to phenol and therefore react neutrally to phenophthalein in aqueous solution.

I claim:

1. The process for preparing sulphurized compounds of phenols being mordants for fixing basic dyes on cotton which consists in heating a phenol with sulphur and a small amount of a neutral salt of a weak acid.

2. The process for preparing sulphurized compounds of phenols being mordants for fixing basic dyes on cotton which consists in heating to a temperature of about 180–210° C. a phenol with sulphur and a small amount of a neutral salt of a weak acid.

3. The process for preparing a sulphurized compound of phenol being a mordant for fixing basic dyes on cotton which consists in heating to a temperature of about 180–210° C., for several hours, about 38 parts phenol with about 20–22 parts of sulphur and about 0.3–0.8 parts of a neutral salt of a weak acid.

4. The process for preparing a sulphurized compound of phenol being a mordant for fixing basic dyes on cotton which consists in heating to a temperature of about 180–210° C., for several hours, about 38 parts phenol with about 22 parts sulphur and 0.8 parts sodium formate.

In testimony whereof I have hereunto set my hand.

ALFRED THAUSS.